United States Patent [19]
Judd

[11] Patent Number: 5,018,459
[45] Date of Patent: May 28, 1991

[54] METHOD AND APPARATUS FOR RECYCLING PAPER PULP SLUDGE

[75] Inventor: Wendell Judd, Fairfield, Ohio

[73] Assignee: Technology Development Corporation, Columbus, Ohio

[21] Appl. No.: 471,971

[22] Filed: Oct. 27, 1989

Related U.S. Application Data

[63] Continuation-in-part of Ser. No. 317,511, May 18, 1989, abandoned.

[51] Int. Cl.$^5$ .............................................. F23G 7/04
[52] U.S. Cl. ................... 110/346; 110/226; 110/238; 110/246
[58] Field of Search ............... 110/246, 226, 238, 346; 432/105, 106

[56] References Cited

U.S. PATENT DOCUMENTS

| | | | |
|---|---|---|---|
| 4,361,100 | 11/1982 | Hinger | 110/238 |
| 4,794,871 | 1/1989 | Schmidt et al. | 110/246 X |
| 4,840,129 | 6/1989 | Jeliner | 110/246 X |
| 4,846,083 | 7/1989 | Serbent | 110/226 X |
| 4,957,048 | 9/1990 | Beer et al. | 110/246 X |

FOREIGN PATENT DOCUMENTS 1123272 2/1962 Fed. Rep. of Germany ...... 110/246

Primary Examiner—Edward G. Favors
Attorney, Agent, or Firm—George Wolken, Jr.

[57] ABSTRACT

This invention provides a method and apparatus for recycling paper pulp sludge. Paper pulp sludge is incinerated in a rotary kiln, typically a rotary cement kiln, asphalt dryer, or fluidized bed incinerator. Paper pulp sludge is fed continuously into said rotary kiln while temperatures are maintained in the range of approximately 800° to 3500° F. During incineration, mixing catalysts (typicaly casein or soy protein) and wood pulp fibers are burned, while moisture is evaporated. The resulting incinerated product consists essentially of carbonate particles which are collected for subsequent use. Typically, but not exclusively, later use of the resulting product could be as mineral filler binding agents in the manufacture of construction products such as concrete, asphalt and others; or in gravel-based construction operations; or in earthen-fill constructions operations; or in other ways.

4 Claims, 1 Drawing Sheet

METHOD AND APPARATUS FOR RECYCLING PAPER PULP SLUDGE

This application is a cont.-in-part of application Ser. No. 07/317,511 filed May 18, 1989 abandoned.

BACKGROUND OF INVENTION

This invention relates to a method and apparatus for recycling waste products. More particularly, this invention relates to a method and apparatus for the recycling of paper pulp sludge typically produced as waste material in the manufacture of paper, cardboard and related products. This invention relates to a recycling method and apparatus for paper pulp sludge, producing thereby waste much reduced in bulk for more effective storage in scarce landfills; waste much reduced in potential toxicity; and waste material useful as component materials in the manufacture of several other products.

Paper manufacturing processes typically begin with a slurry of pulp and water produced as output from a separate pulping process. This pulping process itself produces many kinds of waste materials, not the subject of the present invention. The pulp slurry is typically delivered to the paper-making facility, additional chemicals may be added, and the resulting pulp and water slurry made into paper in a variety of processes, typically involving rapid withdrawal of the water through a screen, depositing thereby the paper onto the screen. The waste water is reprocessed to recover as much usable material and reusable water as economically feasible. Typically, the water is sent to a 'settling tank' in which heavier components settle to the bottom of the tank and are drawn off as 'sludge'. This sludge is typically processed further to remove additional water (typically by mechanical pressing), leading to a quantity of sludge for final disposal. The reprocessing and recycling of this paper-making sludge is the subject of the present invention.

The manufacture of paper, cardboard and related products typically results in large quantities of waste material known as "sludge". This sludge contains large amounts of water, wood fibers, calcium carbonate, other minerals and clays, various mixing catalysts (typically soy protein or casein), and chlorine-based purifying agents used in the paper making process. There is no precise composition for this sludge because there are substantial variations in the wood and other feedstocks used; in the processing materials which must be used to make different types of paper products; and even considerable variation in the processes used by different paper makers in making similar products.

The disposal of this waste sludge is a continuing problem for the paper manufacturers and for the environment in general. Current practice is to subject the sludge to a mechanical pressing operation to remove excess moisture. The resulting residue still holds large quantities of water, as well as the other materials listed above. Under current procedures, this residue is then typically deposited into a landfill for indefinite storage.

There are several problems associated with this treatment of paper pulp sludge. First of all, it is getting increasingly difficult to locate suitable landfills as existing landfills become full and residents typically oppose expansion or creation of new landfills near residences. In addition, the materials which leach from sludge deposited into landfills is hazardous itself. This increases the cost of engineering a suitable disposal site (due to the increased costs of handling such leachates), and increases community and environmental concerns.

The present invention proposes an alternative treatment for this paper pulp sludge. The present invention markedly reduces the bulk of the sludge to be disposed (by typically 75%), thereby markedly extending the life of disposal landfills. Also, the present invention produces a material for disposal that is much less susceptible to leaching, thereby reducing the potential environmental hazards for landfills.

In addition, the present invention offers the possibility of dispensing with landfills entirely. The present invention demonstrates how paper pulp sludge can be processed into a commercial product similar to re-calcified calcium carbonate. (Due to the variation in composition of the sludge noted above, the processed sludge from the present invention has varying compositions.) This processed sludge has many of the useful properties of calcium carbonate and finds use in asphalt, asphalt sealers and coatings, concrete block and pipe, other brick and structural pipe, for gravel-based construction operations such as parking lots or highways, as an additive to backfill material for sewer water and gas pipelines, in ceramics and many other applications.

In addition to the above uses, it is found that the processed sludge of the present invention is very absorbent of oils and can find use as a material for absorbing and removing unwanted accumulations of oil from floors, and elsewhere in the environment.

Thus, the present invention offers the possibility of creating economic benefit from an otherwise difficult and environmentally detrimental, disposal problem.

SUMMARY AND OBJECTS OF INVENTION

The present invention provides a method and apparatus for recycling paper pulp sludge. Paper pulp sludge is incinerated in a rotary kiln, typically a rotary cement kiln, asphalt dryer, or fluidized bed incinerator. Paper pulp sludge is fed continuously into said rotary kiln while temperatures are maintained in the range of approximately 800° to 3500° F. During incineration, mixing catalysts (typically casein or soy protein) and wood pulp fibers are burned, while moisture is evaporated. The resulting incinerated product consists essentially of carbonate particles which are collected for subsequent use.

A primary object of this invention is to reduce the bulk of paper pulp sludge for increased ease of disposal.

Another object of this invention is to remove materials from the paper pulp sludge prior to disposal which may leach into surrounding land and water.

Still another object of this invention is to produce a material from paper pulp sludge having many of the useful properties of calcium carbonate.

Yet another object of this invention is to convert paper pulp sludge from a waste product into a material useful for many applications in the manufacture asphalt, asphalt sealers and coatings, ceramics, concrete block and pipe, other brick and structural pipe and many other products.

Yet another object of this invention is to convert paper pulp sludge from a waste product into a material useful for many applications in gravel-based construction operations such as parking lots or highways, as an additive to backfill material for sewer, water and gas pipelines, and many other applications.

Yet another object of this invention is to produce a material for absorbing various oils such as occurring on factory or garage floors or other indoor or outdoor locations.

DESCRIPTION OF PREFERRED EMBODIMENTS

Figure 1:
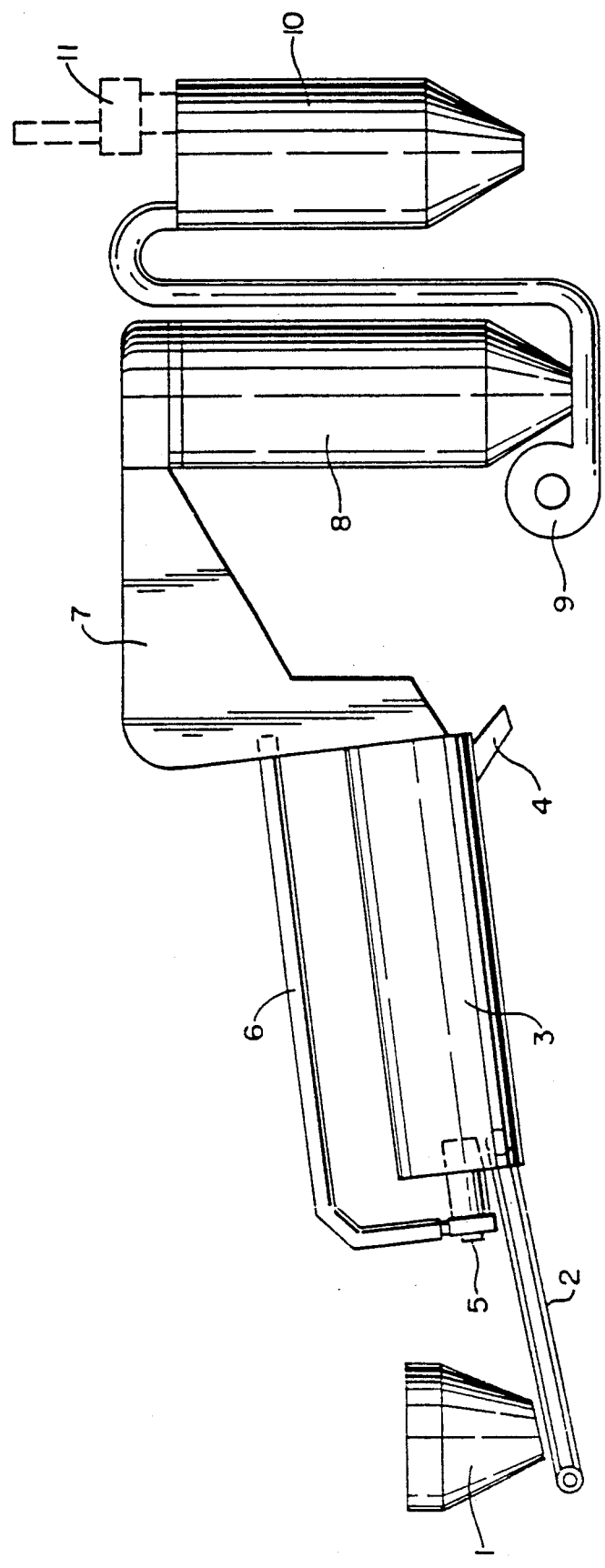
FIG. 1: A perspective view of a typical apparatus in which incineration of paper pulp sludge is performed.

In a typical embodiment of the present invention, paper pulp sludge is fed from a sludge holding bin (1) by means of a slinger conveyer (2) into a heater (3). In typical operation, the feeding operation from bin (1) would be done in a continuous manner, with replenishment of the contents of bin (1) from paper-making operations. Typically, the heater (3) would be a rotary kiln fired by gas or oil, typically by means of a burner (5) producing approximately 80 million BTU. Typical kilns such as an asphalt dryer, rotary cement kiln or fluidized bed incinerator can be successfully employed. The temperature inside heater (3), in the region in which incineration of the paper pulp sludge occurs, is typically maintained in excess of approximately 800° Fahrenheit up to a maximum of approximately 3500° Fahrenheit; the maximum temperature depending primarily on the maximum heating capabilities of the burner (5) and heater (3). These temperatures are sufficient to incinerate the undesirable chemical impurities present in typical paper pulp sludge, including such components as wood fibers, chlorine purifying agents, mixing agents and other. Simultaneously, vestiges of water remaining are also evaporated essentially completely. Temperatures in the higher ranges, above approximately 2400° Fahrenheit will be used to destroy hazardous materials, typically dioxins, which are typically formed in the incineration process.

The incineration products are removed from the heater, typically through product chute (4) at the end of the firing process. Typically, the product will require 10 to 12 minutes to pass through rotary heater (3) and emerge through chute (4) adequately incinerated. The minimum time of transit through the heater (3) will vary with exact product composition, mass, and temperature. However, there are typically no serious problems caused by overheating of the product in the heater, so it is not difficult in practice to achieve an adequate process for typical paper pulp sludges.

A drop-out chamber (7) contiguous with the heater is typically used for product collection. A smoke return (6) continuously captures smoke generated in the typical operation of the present incineration process to avoid release to the environment. The smoke is typically recycled back into the heater (3).

A bag-house (8) is typically used to filter residual fine dust particles ("fines") from the product and direct these fines by means of blower (9) into a fines collection bin (10). In typical operations, the bag-house (8), and fines collector (10) are used to prevent particles from being released into the atmosphere, in compliance with typical environmental regulations and good operating procedure.

In some operations, it may be prudent to mount an auxiliary burner (11) on the exit stack from the process to incinerate finally and completely the materials resulting from the present processing. We anticipate that this final burner will not be required in all cases, but is expected to be useful in some processes.

FIG. 1 shows the paper pulp sludge entering the heater, 3, from the lower end, being transported through heater 3 to emerge at the upper end. An alternative procedure, typically used for asphalt dryers, cement kilns, and other furnaces, would have the material entering the heater from the elevated end, receiving processing in its downhill passage to emerge from the lower end of the heater. An uphill traverse, as shown in FIG. 1, would require the use of spiral transport vanes or another well-known and obvious means for transporting the material through the heater. A downhill traverse would typically not require extra transporting mechanisms, depending on gravity and the rotary action of the heater to move the material from the entrance to the exit of said heater. Both types of heater, uphill or downhill traverse can be used to practice the present invention with no significant difference in the results, since both types of heaters can provide comparable temperatures and transit times for processing sludge in accordance with the present invention.

The material resulting from the process of the present invention has properties similar to that of calcium carbonate. As such it can be used as mineral filler binding agent in the manufacture of asphalt, asphalt coatings, asphalt sealants, ceramics, concrete, cement pipe, clay pipe, structural block or brick, all in combination with conventional materials used in the manufacture of said articles familiar to those with ordinary skill in the art. Furthermore, material resulting from the process of the present invention can be used as a compacting agent and filler in performing gravel-based or earthen-fill construction operations in combination with conventional materials used in said construction operations in ways familiar to those with ordinary skill in the art.

In addition, the material resulting from the process of the present invention is capable of absorbing large quantities of oil. Typically a weight of oil well in excess of the weight of material can be absorbed. Thus, the material of the present invention can be used as a means from removing oil as typically spilled on factory or garage floors or from other indoor or outdoor locations, wherever unwanted quantities of oil have accumulated.

There is typically a wide variation in the composition of paper pulp sludge due the variations in feedstock materials, variations in processing used to make various kinds of papers, and variations in the processes used by different manufacturers. Therefore, the processing temperatures and times are also subject to variations, but sufficient conditions are easily determined by simple tests on pilot runs. The parameters and conditions here are typical conditions found to be sufficient for a wide range of processing needs for paper pulp sludges. Obvious modifications to this process will be apparent to those skilled in the art to meet special cases occurring with for a particular paper pulp sludge.

What I claim is:

1. A method for recycling paper pulp sludge comprising the steps of;
    (a) introducing paper pulp sludge into a heater wherein said heater maintains a temperature of at least 800° Fahrenheit,
    (b) rotating said heater containing said paper pulp sludge while maintaining said temperature of at least 800° Fahrenheit until essentially all water contained in said paper pulp sludge is removed by evaporation and further, until essentially all wood fibers and mixing catalysts contained in said paper pulp sludge are incinerated, resulting in a substantially dry incineration product, (c) extracting said incineration product from said heater.

2. A method as in claim 1 wherein said paper pulp sludge is introduced continuously into a first end of a continuously rotating heater, and said incineration product is continuously extracted following drying and incineration from the opposite end of said rotating heater.

3. A method as in claim 2 wherein said continuously rotating heater maintains a temperature of at least 2,400° Fahrenheit for sufficient time to destroy essentially all dioxin products formed by said incineration of said paper pulp sludge.

4. A method as in claim 2 wherein the smoke caused by said incineration is continuously collected and reintroduced into said heater without significant leakage of said smoke to the environment.

* * * * *